United States Patent
Winner et al.

(10) Patent No.: US 8,126,640 B2
(45) Date of Patent: Feb. 28, 2012

(54) METHOD AND DEVICE FOR PREDICTING THE COURSE OF MOTOR VEHICLES

(75) Inventors: Hermann Winner, Bietigheim (DE); Werner Urban, Vaihingen/Enz (DE); Jens Lueder, Kornwestheim (DE); Alexander Maass, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 1746 days.

(21) Appl. No.: 10/512,183

(22) PCT Filed: Dec. 7, 2002

(86) PCT No.: PCT/DE02/04487
§ 371 (c)(1),
(2), (4) Date: Apr. 22, 2005

(87) PCT Pub. No.: WO03/093914
PCT Pub. Date: Nov. 13, 2003

(65) Prior Publication Data
US 2005/0228580 A1    Oct. 13, 2005

(30) Foreign Application Priority Data
Apr. 27, 2002    (DE) .................... 102 18 924

(51) Int. Cl.
*G01C 21/00* (2006.01)
*G06F 17/00* (2006.01)
(52) U.S. Cl. ......... 701/200; 701/202; 701/310; 701/300
(58) Field of Classification Search .................. 701/200, 701/300; 340/436, 903, 904; 342/70
See application file for complete search history.

(56) References Cited

U.S. PATENT DOCUMENTS

| | | | | |
|---|---|---|---|---|
| 4,158,841 A * | 6/1979 | Wuchner et al. | ................ | 342/71 |
| 4,632,543 A * | 12/1986 | Endo | ............................ | 356/5.08 |
| 4,757,450 A * | 7/1988 | Etoh | .............................. | 701/96 |
| 4,786,164 A * | 11/1988 | Kawata | ........................ | 356/5.05 |
| 4,970,653 A * | 11/1990 | Kenue | ........................... | 701/301 |
| 5,343,206 A * | 8/1994 | Ansaldi et al. | .................. | 342/70 |
| 5,467,283 A * | 11/1995 | Butsuen et al. | ............... | 701/301 |
| 5,510,990 A * | 4/1996 | Hibino et al. | ................... | 701/96 |
| 5,629,851 A * | 5/1997 | Williams et al. | ................ | 701/96 |
| 5,745,870 A * | 4/1998 | Yamamoto et al. | ........... | 701/301 |
| 5,751,211 A * | 5/1998 | Shirai et al. | ................... | 340/435 |
| 6,125,324 A * | 9/2000 | Matsuda et al. | .............. | 701/208 |

(Continued)

FOREIGN PATENT DOCUMENTS

DE    197 20 764    11/1997
(Continued)

*Primary Examiner* — Khoi Tran
*Assistant Examiner* — Ian Jen
(74) *Attorney, Agent, or Firm* — Kenyon & Kenyon LLP

(57) ABSTRACT

A method for travel course prediction in a motor vehicle having a position finding system for objects situated ahead of the vehicle is provided. In accordance with the method, a function describing the shape of the roadside is calculated on the basis of measured distance data and angle data for stationary roadside targets, wherein multiple stationary targets are identified and tracked. The path of the road is estimated for various subsets of the set of tracked stationary targets, under the assumption that these stationary targets are situated along the roadside, and roadside targets are differentiated from interfering objects on the basis of the plausibility of the resulting possible shapes of the roadside, the most probable shape of the roadside being determined on the basis of the roadside targets.

25 Claims, 12 Drawing Sheets

U.S. PATENT DOCUMENTS

| | | | |
|---|---|---|---|
| 6,141,617 A * | 10/2000 | Matsuda et al. | 701/72 |
| 6,226,571 B1 * | 5/2001 | Kai | 701/1 |
| 6,230,093 B1 * | 5/2001 | Michi et al. | 701/96 |
| 6,300,865 B1 * | 10/2001 | Fechner et al. | 340/436 |
| 6,553,283 B2 * | 4/2003 | Shirai et al. | 701/1 |

FOREIGN PATENT DOCUMENTS

| | | |
|---|---|---|
| DE | 197 22 947 | 2/1999 |
| DE | 199 44 542 | 4/2001 |
| DE | 101 38 641 | 2/2003 |
| JP | 1509005 T | 8/1999 |
| JP | 2001526397 T | 12/2001 |
| WO | WO 9742521 | 11/1997 |
| WO | 99 30 183 | 6/1999 |
| WO | WO 03/015053 | 2/2003 |

* cited by examiner

METHOD AND DEVICE FOR PREDICTING THE COURSE OF MOTOR VEHICLES

FIELD OF THE INVENTION

The present invention relates to a method and a device for travel course prediction in motor vehicles having a position finding system for objects situated ahead of the host vehicle, in which a function describing the shape of the roadside is calculated on the basis of the measured distance and angle data for stationary targets on the roadside. The present invention in particular relates to a method for travel course prediction in conjunction with an ACC system (Adaptive Cruise Control) which is used to regulate the distance between the host vehicle and a lead vehicle located with the help of a position finding system so that the lead vehicle is followed at a suitable safety distance.

BACKGROUND INFORMATION

Modern vehicles are often equipped with a driver assistance system which supports the driver in driving the vehicle and facilitates the execution of certain driving maneuvers. To this end, the driver assistance system requires information about the vehicle's surroundings, this information being obtained via the position finding system, e.g., a radar system, a lidar system or a video camera system. The ACC system is an example of such a driver assistance system or a subsystem of such a driver assistance system, which is also capable of fulfilling additional functions. Details regarding such an ACC system are described, for example, in the publication "Adaptive Cruise Control—System Aspects and Development Trends" by Winner, Witte et al., published as SAE Technical Paper Series No. 961010 at SAE on Feb. 26 through 29, 1996. If the position finding system in an ACC system is based on a radar sensor, then not only the distances of the objects but the relative speeds of the objects are measurable directly with the help of the Doppler effect, so that by comparing these relative speeds with the absolute speed of the host vehicle, i.e., the vehicle equipped with the ACC system, it is possible to differentiate between lead vehicles and stationary objects, also called stationary targets, such as traffic signs, guardrail posts and the like.

For the distance regulating function, it is also necessary to differentiate between vehicles traveling in the host vehicle's lane and those traveling in neighboring lanes. This is possible because the radar system also has a certain angular resolution. The position of the located objects may then be obtained in a two-dimensional Cartesian coordinate system based on the distance data and angle data. In the case of a straight path of the road, it is thus possible to estimate relatively reliably whether a lead vehicle is in the host vehicle's lane or in a neighboring lane. In the case of a curved path of the road, however, the road curvature must also be taken into account in making this decision. Therefore, an important component function of the ACC system is to estimate the anticipated path of the road in a certain section ahead of the host vehicle. This function is known as travel course prediction.

In a known method for travel course prediction, the host vehicle movement data is analyzed. On the basis of the steering angle and/or the transverse acceleration or yaw rate of the vehicle measured by suitable sensors, the road curvature in the section of road on which the vehicle is currently traveling may be estimated in conjunction with the speed of the host vehicle. The travel course prediction is then based on the assumption that the road curvature will change slightly in the section of road directly ahead.

German Patent No. 197 20 764 describes a method of the type defined in the preamble, in which travel course prediction is based essentially on the position finding of stationary roadside targets. Although the relatively smooth road surface generally has only a low reflectivity for radar waves, there are frequently objects having a higher reflectivity on the roadside. These roadside objects may be spatially limited objects such as posts, traffic signs and the like which are identifiable and trackable using the known tracking methods and repeated radar measurements, but they may also be extensive objects such as guardrails, greenery, walls and the like, where such tracking is impossible. The publication cited above describes a method in which both types of roadside objects may be used to determine the path of the road. To this end, the tracking angle range of the radar is divided into discrete segments, and the stationary targets which are situated at or beyond the roadside are identified for each segment by comparing the threshold value of the amplitudes of the received radar echoes for each segment. A function which approximately reflects the shape of the roadside is then calculated by curve regression from the distance data for the roadside obtained for each angular segment.

In this method, a somewhat reliable value for the distance from the roadside must be determined for each angular segment, and to this end, radar echoes having a relatively small amplitude must also be analyzed. This results in complex processing and a relatively great susceptibility of the method to interference.

German Patent No. 197 22 947 describes another method for travel course prediction in which the main data used for travel course prediction is the tracking data on vehicles traveling ahead. However, an accurate travel course prediction is made difficult here by the fact that in the case of a wider road, e.g., a three-lane road, the lead vehicles have a relatively great lateral offset within the lane. It is proposed in the publication cited above that stationary targets should also be used for travel course prediction.

In general it is expedient to combine several different methods of travel course prediction and to adjust them mutually to thereby improve the accuracy and reliability of the travel course prediction.

SUMMARY OF THE INVENTION

An object of the present invention is to provide a method for travel course prediction which permits a relatively accurate prediction of the path of the road with relatively minor processing complexity.

This object is achieved according to an example embodiment of the present invention by identifying and tracking multiple stationary targets and estimating the shape of the roadside for various subsets of the set of tracked stationary targets under the assumption that these stationary targets are situated along the roadside and by differentiating between roadside targets and interfering objects on the basis of the plausibility of the possible shapes of the roadside thus obtained and determining the most probable shape of the roadside on the basis of the roadside targets.

Thus with the proposed method, localized stationary targets whose movement in relation to the host vehicle is trackable over multiple radar measuring cycles by known tracking methods are used primarily to determine the shape of the roadside. These stationary targets may be roadside objects, e.g., posts, traffic signs and the like which are situated directly on the roadside or objects at a greater distance from the roadside, which are to be referred to here as interfering objects. It is impossible to decide on the basis of the tracking data alone which type of stationary target has been detected. Therefore, with the method according to an example embodiment of the present invention, it is assumed initially that the objects are located directly on the roadside and may thus be used as interpolation points for a function, e.g., a polynomial, describing the shape of the roadside. The greater the number of interpolation points used, the greater is the accuracy with which the actual shape of the roadside may be approximated.

However, since the stationary targets used as interpolation points may also be interfering objects which are not actually on the roadside, roadside shapes which differ greatly from the true roadside shape may also be obtained, depending on the choice of the interpolation points. However, it is also possible to recognize and eliminate such false roadside shapes on the basis of a few plausibility criteria. Examples of suitable plausibility criteria are described in greater detail below. If such plausibility checks are performed for the conceivable combinations of interpolation points, it will become apparent which interpolation points are true roadside targets, so that the curves calculated on the basis of these interpolation points describe the actual shape of the roadside consistently and with a relatively high accuracy and reliability.

One advantage of this method is that it is based essentially on localized stationary targets which are characterized by a relatively high amplitude in the radar echo and therefore may be tracked accurately and reliably. This yields a method that is very stable with respect to interfering influences. In general, at a given point in time only a limited number of such local stationary targets will be located within the tracking range of the radar, so the analysis may be accomplished with a justifiable computation effort. Another important advantage is that the stationary targets may be tracked over a plurality of measuring cycles, so that the multitude of objects analyzed in a given measuring cycle is already known from previous measuring cycles. Consequently, it is possible to rely on previous results in classifying these objects as roadside targets or interfering objects.

In the case of stationary targets, it is also possible on the basis of the known vehicle movement determined by its speed and yaw rate to calculate the positions of the stationary targets in relation to the host vehicle for points in time when these targets are already outside the range of detection of the position finding system.

For an accurate travel course prediction, the shape of both the right and left sides of the road may be determined. The particular procedures are mutually independent for the most part, but one procedure may benefit from the results of other procedures. For example, if an object has already been detected relatively reliably as a roadside target when determining the right side of the road, this object may be eliminated from the beginning in determining the left side of the road. Furthermore, the curvatures of the two sides of the road must not contradict one another.

In one embodiment of this method, which is to be referred to as an approximation method, in a first step the stationary targets detected are classified as roadside targets or interfering objects and are assigned to the right or left side of the road. After eliminating the interfering objects, in the next step a function indicating the most probable shape of the roadside is calculated for each roadside on the basis of the particular roadside objects.

A plausibility criterion for identification of interfering objects and for assignment of objects to the right or left side of the road may be derived from this by comparing the positions of the stationary targets with the positions of vehicles traveling ahead. If a stationary target and a lead vehicle are at the same distance from the host vehicle, an upper limiting value for the angular distance between the lead vehicle and a roadside object yields from the road width, or from the road width known from previous processing cycles and from the measured distance. If the angular distance is greater than this limiting value, the particular stationary target may be eliminated as an interfering object. This criterion is also suitable for eliminating interfering objects which are on or above the road surface. This is true in particular of direction signs which are mounted on bridges above the road surface and which may still be within the tracking range of the radar at a greater distance. When a lead vehicle seemingly "drives over" such a stationary target, then the stationary target may be eliminated as an interfering object. Likewise a stationary target may be unambiguously assigned to the right or left side of the road when a lead vehicle passes the stationary target on the left or on the right, respectively.

Although the use of these criteria presupposes that there is at least one lead vehicle, this restriction is not important in practice, because in most practical applications, e.g., in adaptive cruise control, there is a need for travel course prediction only when there are also lead vehicles.

Another plausibility criterion is based on the assumption that the host vehicle will not exceed a certain transverse acceleration. In conjunction with the known speed of the vehicle, this yields an upper limiting value for a "plausible" curvature of the road and thus also for a plausible curvature of the side of the road.

A curved roadside may be described in closest approximation by a parabola of the form $y=a+cx^2$. The curvature (second derivative) is then equal to $2c$. For determination of coefficients a and c, only two interpolation points are needed, either the positions of two stationary targets or the position of one stationary target together with the estimated or known position of the roadside in line with the host vehicle. If the shape of the right and left roadsides has already been approximated by suitable functions in a prior calculation cycle, then coefficient a for both sides of the road is already known. If the road width and the lateral position of the host vehicle on the road are still unknown, it may be assumed that the road will have a certain minimum width, which is at any rate greater than the width of the vehicle. For example, it is practical to assume that the road has a width of seven meters and that the host vehicle is traveling in the center of the road. For a parabola describing the right side of the road, this yields directly $a=3.5$ m. Coefficient c is then calculated directly from the coordinates of a single object with the assumption that this object is directly on the right side of the road. If this yields an unacceptably high value for curvature $2c$, that particular stationary target may be classified as an interfering object. This criterion is more efficient, the greater the proximity of the object in question to the host vehicle.

Another criterion is based on the assumption that the curvature of the road does not change abruptly, i.e., the change in the curvature of the road per section traveled must be below a certain threshold value which is selected expediently as a function of the speed of the host vehicle and/or as a function of the road width, which is usually known.

It follows specifically from this criterion that the curvature of the roadside calculated for a single object must conform to the instantaneous movement state of the vehicle in the case of near objects. For example, if a certain curvature to the left is obtained from the measured transverse acceleration or yaw rate of the vehicle, but a marked curvature to the right is obtained for a nearby stationary target under the assumption that it is situated on the right side of the road, then this stationary target may be classified as an interfering object.

A corresponding criterion also applies to objects whose distances from the host vehicle differ only slightly. For example, if it is assumed that both objects are on the right side of the road, then a certain roadside curvature is obtained for the first object by using the position of this object and the right side of the road at the level of the host vehicle as interpolation points. For the second object a roadside curvature is obtained in the same way or using the positions of the two objects as interpolation points. The difference between the curvatures for the two objects may then be no greater than a certain threshold value which depends on the distance between the two objects.

A similar criterion may also be formulated for the allocation of the objects to the right or left side of the road: if there is no imaginary road having a certain minimum width (e.g., seven meters) for two objects, the minimum width passing between the two objects and for which the maximum curvature is smaller than a certain limiting value (e.g., corresponding to a transverse acceleration of 3 m/s$^2$), then the two objects are on the same side of the road.

If a certain number of roadside objects (e.g., for the right side of the road) have been identified, there is a criterion for classification of additional objects namely that the shape of the roadside obtained for the new object must be consistent with the shape of the roadside already ascertained. To test this criterion, a fitting function may be calculated on the basis of the roadside targets already identified such that this function passes through the positions of these roadside targets or runs at a slight distance from them (curve regression) and a check is then performed for the new object to determine whether its distance from this fitting function is greater or less than a certain threshold value.

By using a suitable combination of such criteria, it is usually possible to reliably predict the shape of the right and left sides of the road. Any mistaken estimates in classifying certain objects as interfering objects or in allocating them to the right or left sides of the road usually become obvious in one of the following measuring and computation cycles and are then corrected appropriately.

In another embodiment of the method, which is referred to as a "statistical method," it is not necessary to classify the stationary targets individually as interfering objects or as roadside targets and to assign them to a certain side of the road. The plausibility criterion here is that the curvature of the road obtained for various combinations of stationary targets shows a significant accumulation at that "correct" curvature. The effects of interfering objects are thus eliminated by the statistical analysis in this method.

Without differentiating according to the right or left sides of the road, all possible combinations and/or subsets having a certain size are formed from the totality of all stationary targets detected, and the elements of each subset are used as interpolation points for a function which indicates a hypothetical shape of the roadside. This yields a plurality of functions for the statistical analysis. If necessary, certain combinations which are obviously implausible are eliminated in advance, e.g., stationary targets situated on a line running essentially across the current direction of travel.

For at least one curve parameter, e.g., for the curvature, a histogram is created, indicating how often the various curvatures occur in the set of curves. The true curvature of the road is then apparent in the histogram as a pronounced maximum. A curve whose curvature corresponds to the maximum in the histogram or optionally to a weighted average of the resulting curvatures, the area center of gravity in the histogram or the like, is calculated for the final travel course prediction. The curves may be described by polynomials, e.g., by polynomials of the form $y=a+cx^2$. Coefficients c then have a definite maximum at the actual road curvature or, if necessary, in tighter curves, they may also have two maximums located close together for the curvatures of the right and left sides of the road. Constant term a also has a significant frequency at two values indicating the location of the right and left sides of the road at the level of the host vehicle. This yields directly two functions (parabolas) which describe the shape of the right and left sides of the road.

To increase accuracy, the error range of the measured data for the individual stationary targets may be taken into account in the statistical analysis, so that curves based on more accurately measured objects (objects in closer proximity) are weighted more heavily.

Again with this method, the measurements of the positions of lead vehicles may also be used in addition, e.g., to eliminate certain combinations of stationary targets from the beginning. For example, if it has been found that a lead vehicle has passed an object A on the left and an object B on the right, then the combination (A, B) may be eliminated because it evidently does not represent a true shape of the roadside.

DETAILED DESCRIPTION

Figure 1:
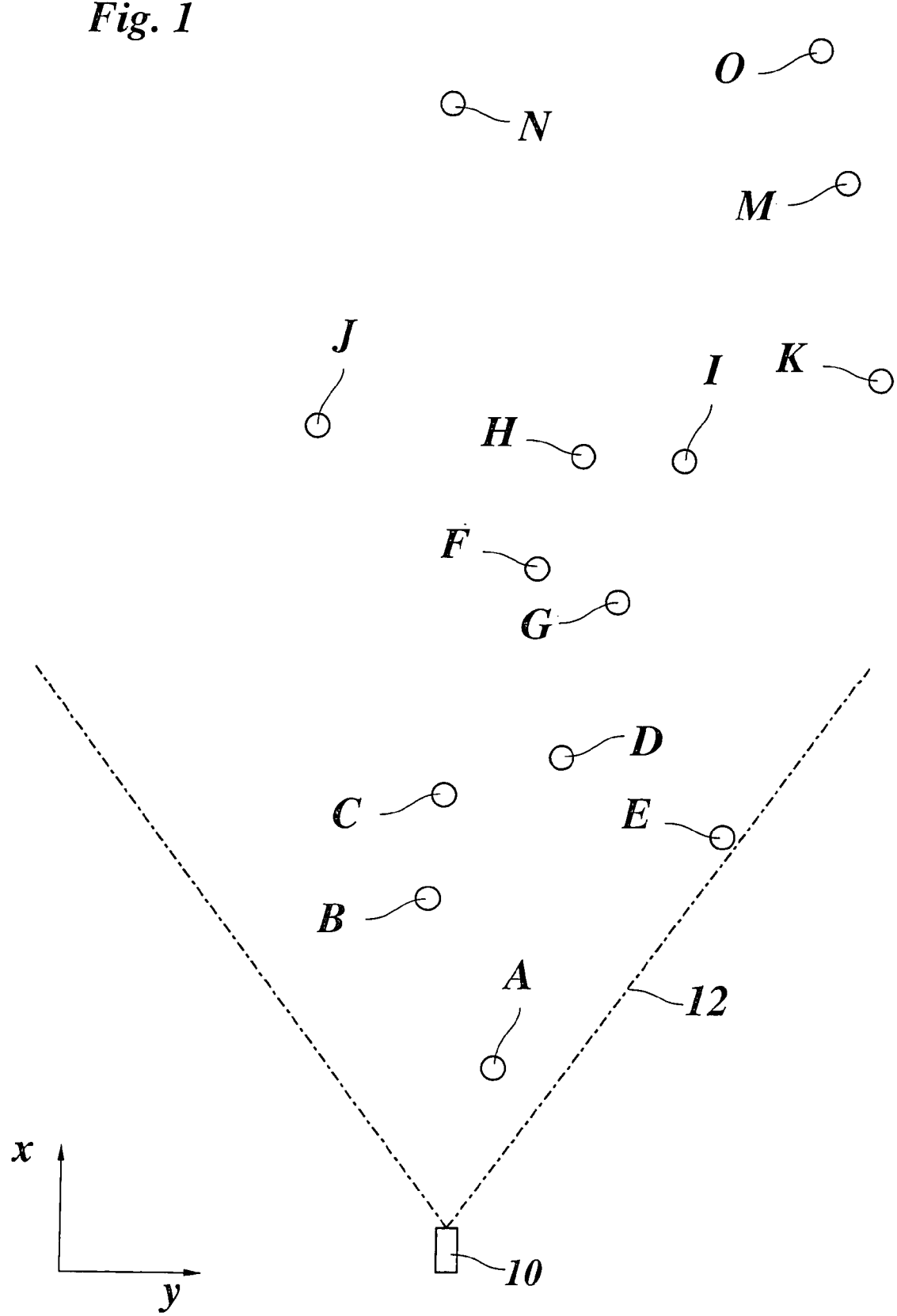
FIG. 1 shows a diagram which indicates the position of a vehicle and the positions of objects located using a position finding system in the vehicle in a two-dimensional coordinate system.

FIG. 1 shows a top view of a vehicle 10 which is equipped with an ACC system. The ACC system includes a radar sensor as a tracking sensor. Tracking angle range 12 of the radar sensor is indicated with dash-dot lines. The direction of travel of vehicle 10 is indicated by an arrow x. The direction perpendicular to the direction of travel is labeled as y.

In the tracking range of the radar sensor there are multiple objects A-O which have been identified as stationary targets because their relative speed in relation to vehicle 10 is equal to the speed of vehicle 10 but in the opposite direction. The coordinates (x, y) have been measured for each of objects A-O with the help of the radar system which has angular resolution. The object now is to determine the forecasted path of the road on the basis of the positions of objects A-O, a few of which are located on the roadside but others are beyond the roadside. To this end, functions indicating the shape of the right and left sides of the road are to be calculated. These functions in the example found here are second-degree polynomials of the form $y=a+cx^2$.

For calculation of coefficients a and c, where constant term a denotes the distance from the roadside at the level of vehicle 10 and 2c denotes the curvature of the road, at least two interpolation points are needed in each case. For the function describing the right side of the road, roadside objects situated on the right side of the road must be selected as interpolation points. The same is true for the left side of the road.

Objects A-O must therefore first be classified according to whether they are roadside objects or interfering objects beyond the side of the road. In addition, a decision must be made for each object as to whether it is on the right or left side of the road. Plausibility criteria are used for this classification, as explained in detail below.

Figure 2:
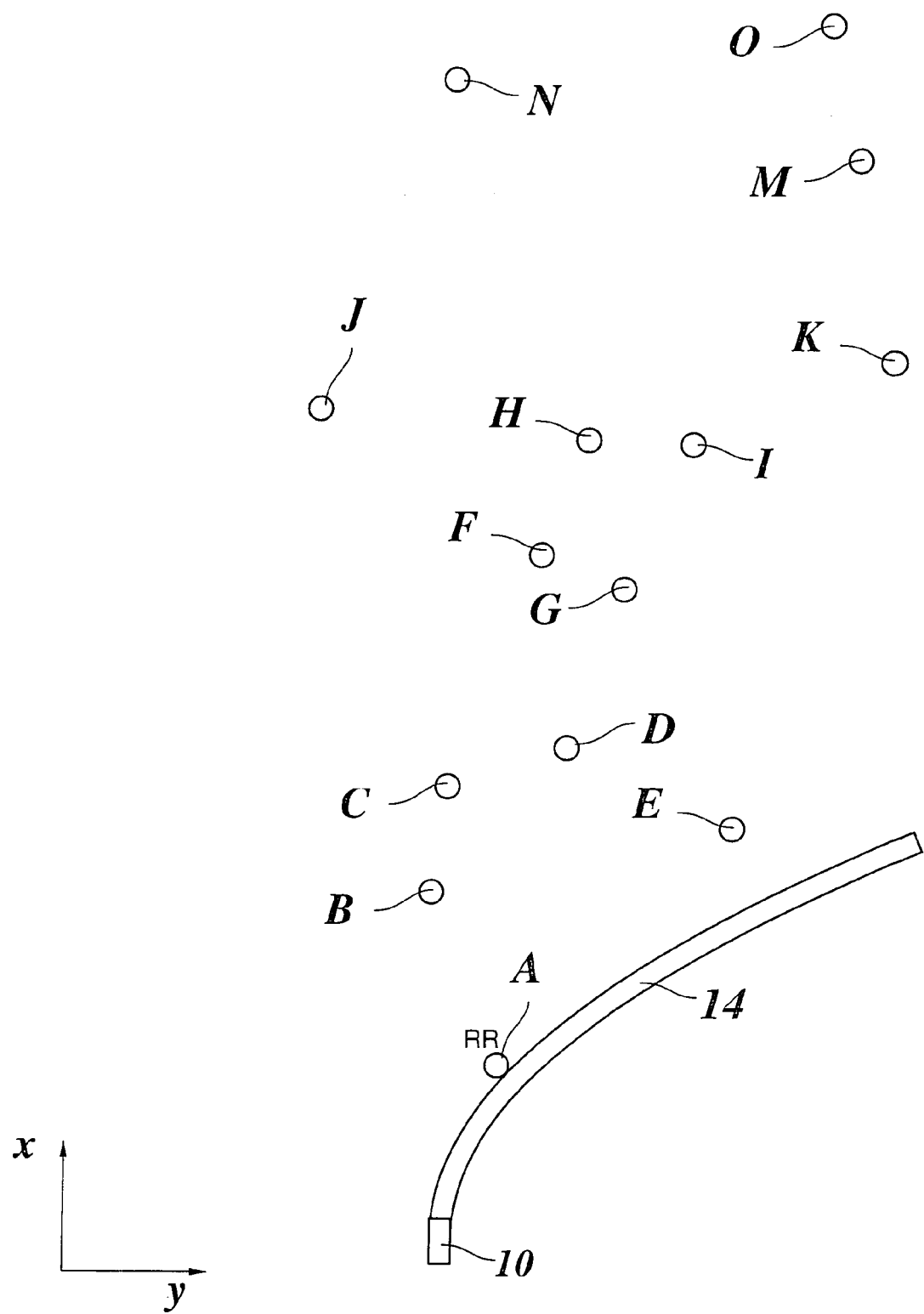
FIG. 2 shows a diagram corresponding to FIG. 1 to illustrate a first plausibility criterion.

FIG. 2 illustrates a first plausibility criterion which is used to classify object A which is closest to vehicle 10. It is therefore initially assumed on a trial basis that object A is on the left side of the road and a function $y=a+cx^2$ is calculated; this function describes the shape of the left side of a hypothetical road 14 which is to the right of object A.

Constant term a indicates the distance from the left side of the road for vehicle 10 at the level of the vehicle (at x=0). If functions describing the shape of the right and left sides of the road have already been calculated in previous measuring and computation cycles, then value a is already known. If necessary, value a is estimated on the basis of a plausible assumption for the road width.

Coefficient c may be calculated by using the coordinates (x, y) of object A in the function equation. Of a real road it may be assumed that the curve will not be excessively tight. Quantitatively the assumption is that the maximum curvature of the road is so small that the corresponding transverse acceleration of vehicle 10 at the current vehicle speed will be no greater than a certain value, e.g., no greater than 3 m/s$^2$. This yields a certain limiting value for coefficient c. In the example shown here, the value for c calculated from the coordinates of object a is greater than this limiting value. In other words, hypothetical road 14 is implausible and consequently object A must not be on the left side of the road. Object A is therefore classified as an object on the right side of the road, which is indicated by symbol RR in FIG. 2.

Figure 3:
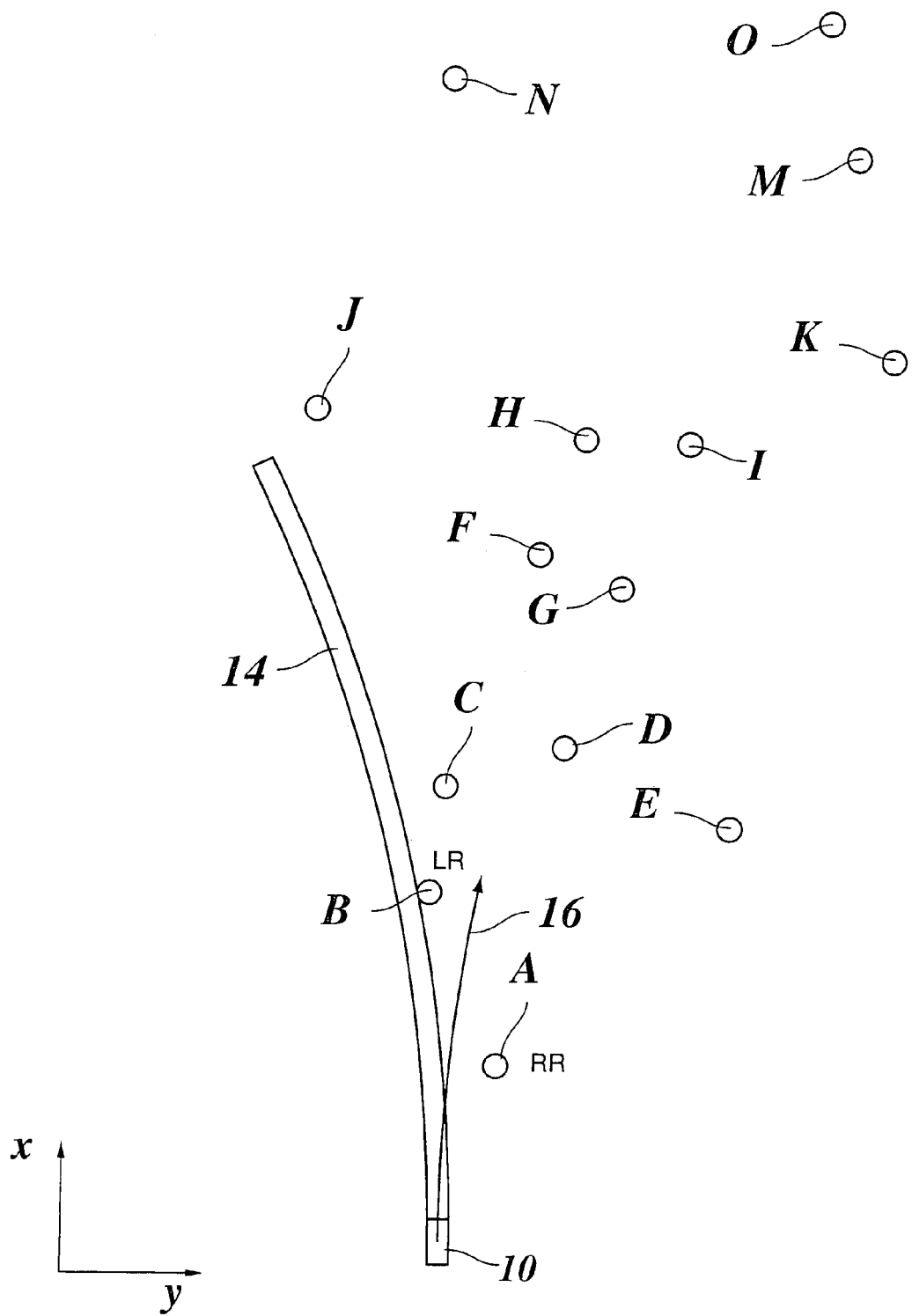
FIG. 3 shows a diagram to illustrate a second plausibility criterion.

The same criterion is next applied to object B, which is the second closest to the vehicle. A value for c which is almost equal to zero is obtained here, so this meets the first criterion. Object B could therefore be situated on the left side of the road. However, the possibility that it is on the right side of the road must not be ruled out. Therefore, a similar plausibility check is also performed for the right side of the road as illustrated in FIG. 3. For coefficient c, this yields a smaller value (in terms of absolute value) which is below the limiting value. Therefore, it is impossible to decide on the basis of the criterion given above whether object B is on the right or left side of the road.

This decision is based on the prevailing driving dynamics of vehicle 10 as an additional criterion. The movement of vehicle 10 is indicated by a curved arrow 16 in FIG. 3. The curvature of arrow 16 corresponds to the current steering angle and thus to the current transverse acceleration of vehicle 10. It is apparent here that vehicle 10 is currently executing a curve to the right, whereas hypothetical road 14 indicates a curve to the left. However, it is implausible for the direction of curvature of the road to change so greatly in the relatively short distance from vehicle 10 to object B. Therefore, on the basis of this criterion, object B may be classified as an object on the left side of the road, indicated by symbol LR in FIG. 3.

Figure 4:
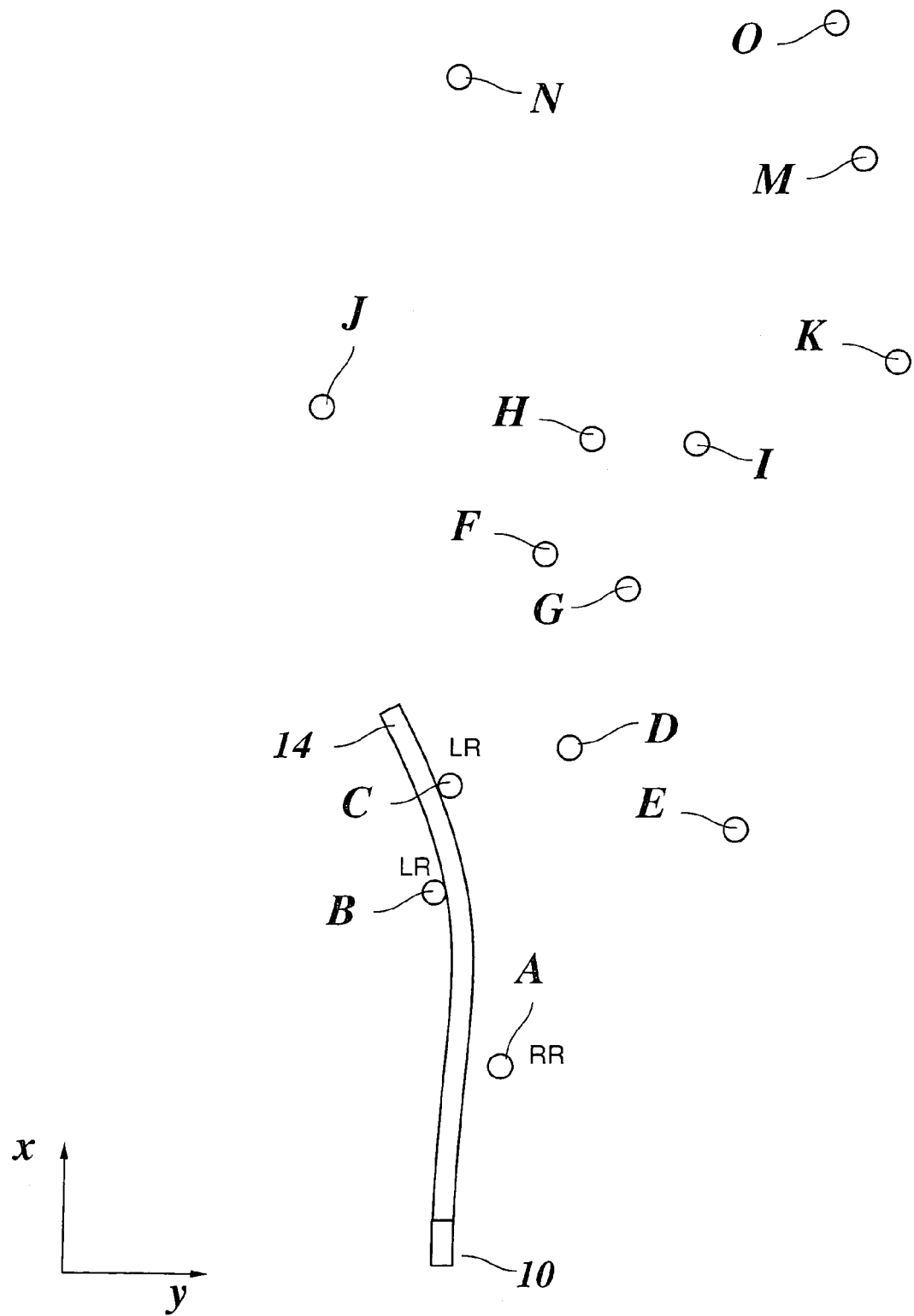
FIG. 4 shows a diagram to illustrate a third plausibility criterion.

Similar plausibility checks are performed sequentially with increasing object distances for objects C through O. For object C, however, none of these plausibility checks would yield an unambiguous result if the presence of object B were disregarded. As FIG. 4 shows, another plausibility check is therefore performed for object C, again based on the assumption that the true road has only a limited curvature. It is assumed on a trial basis that object C is on the right side of the road. Since object B was already classified as an object on the left side of the road, hypothetical road 14 must then pass between objects B and C. In addition, it is assumed that hypothetical road 14 has a certain minimum width, e.g., seven meters. These assumptions are not met by a parabolic road path. The road would then lead past object B. It would be possible to decide merely on the basis of this criterion that object C is on the left side of the road.

In this example, however, a somewhat more complex plausibility check, which is applicable in a more comprehensive class of situations, is performed. Hypothetical road 14 is therefore described by a third-degree polynomial, i.e., a function of the form $y=a+cx^2+dx^3$. Constant term a is again given by the distance from the roadside at the level of vehicle 10. Coefficients c and d are determined on the basis of the positions of objects B and C. Object B is not taken directly as an interpolation point, but instead a point that is offset to the right from object B by half the road width (3.5 m) is selected. Accordingly, an interpolation point offset 3.5 meters to the left is used instead of object C. If the coordinates of the interpolation point at B are used in the function equation in one case and the coordinates of the interpolation point at C are used in another case, this yields an equation system that is solvable for c and d. The curvature of road 14 is given by the second derivative of the function, i.e., 2c+6dx. In the value range between x=0 and x="distance of object C," this curvature must not be greater than the limiting value for the curvature of the road. Since this condition is not met in the example shown here, it may be concluded that objects B and C are on the same side of the road. Since B has already been classified as an object on the left side of the road, object C has the same classification LR.

Figure 5:
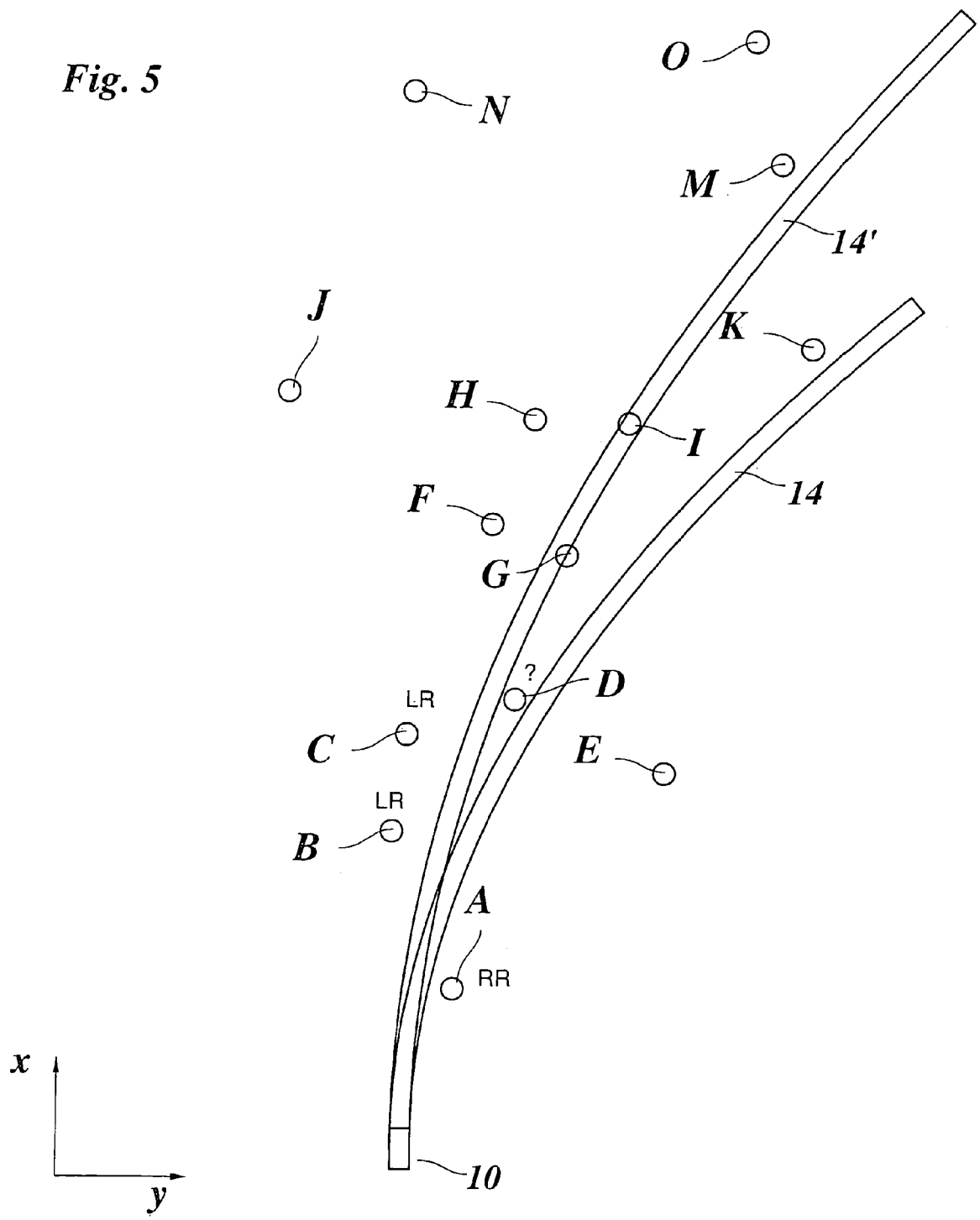
FIG. 5 shows a diagram to illustrate the use of the plausibility criteria on additional objects.

FIG. 5 shows hypothetical road paths 14, 14' for the assumption that object D is on the left side of the road in one case and on the right side of the road in the other. These two paths of the road are possible on the basis of the criteria described, so that the classification of object D remains uncertain at the present time.

Figure 6:
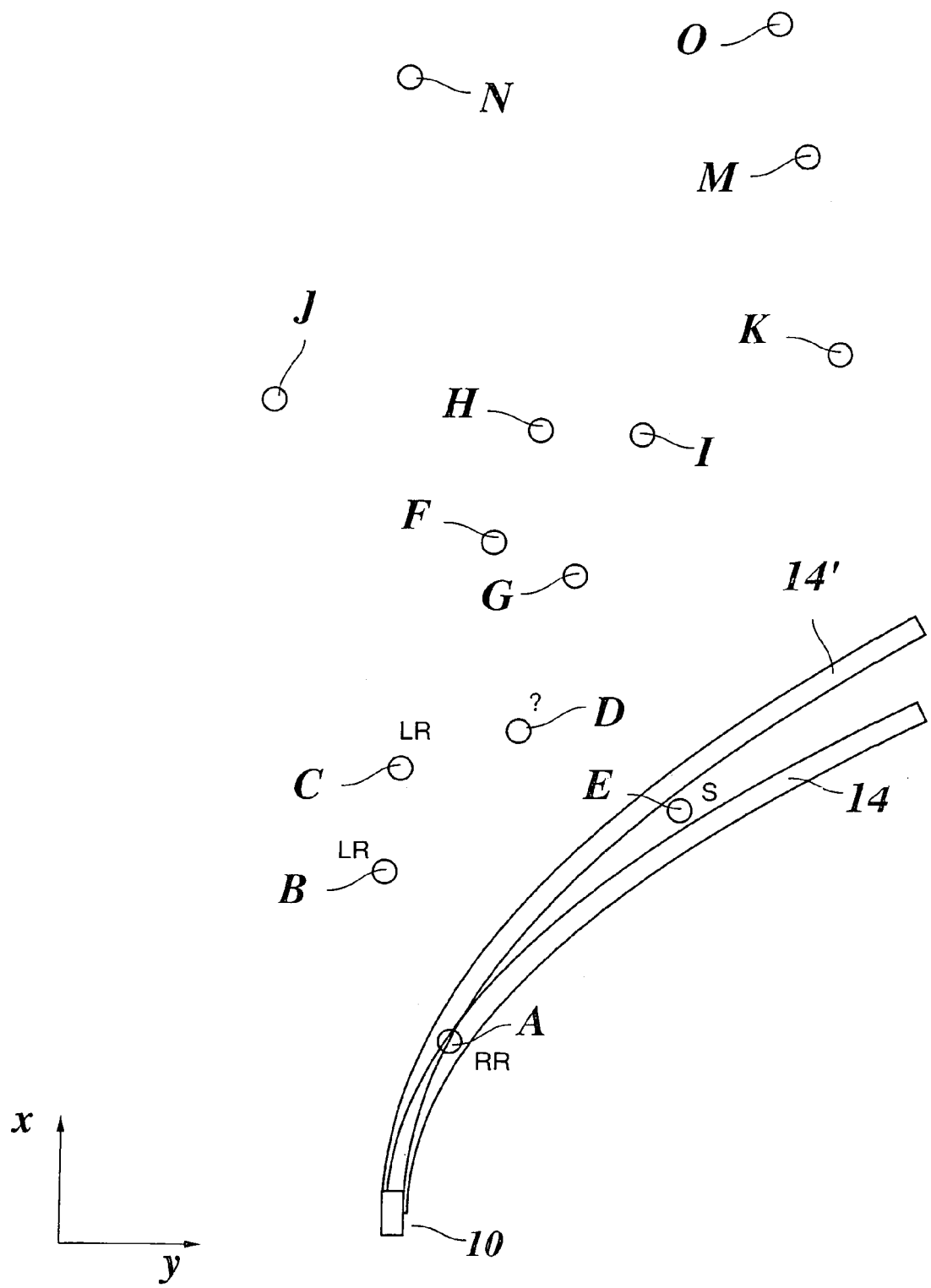
FIG. 6 shows a diagram to illustrate a fourth plausibility criterion.

FIG. 6 shows corresponding road paths 14, 14' for object E. However, the two hypothetical road paths 14 and 14' here would collide with object A. The same considerations as those explained in conjunction with object C here yield not only the conclusion that object E is on the right side of the road but also the conclusion that this object is not a roadside object but instead is farther away from the actual roadside. Object E is therefore classified as an interfering object, indicated by symbol S.

Figure 7:
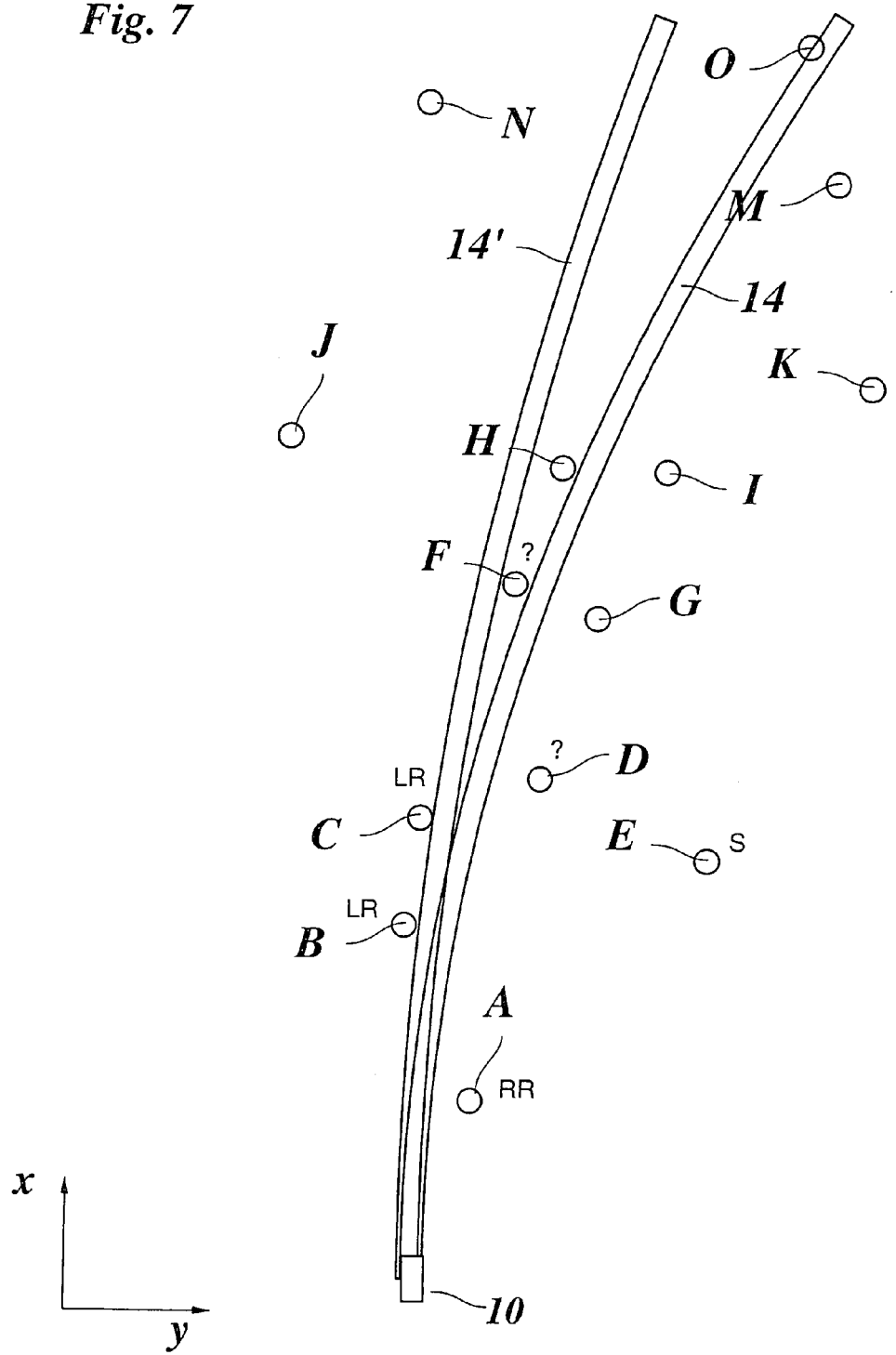
FIG. 7 shows a diagram to illustrate the use of the plausibility criteria on additional objects.

FIG. 7 shows hypothetical road paths 14, 14' for object F. Here again, the previous plausibility checks do not result in a definitive result, so the classification remains undefined.

Accordingly, the plausibility criteria discussed previously would also not yield a definitive result with objects G, H and I. However, they do allow a conclusion regarding the assignment to the right or left sides of the road.

Figure 8:
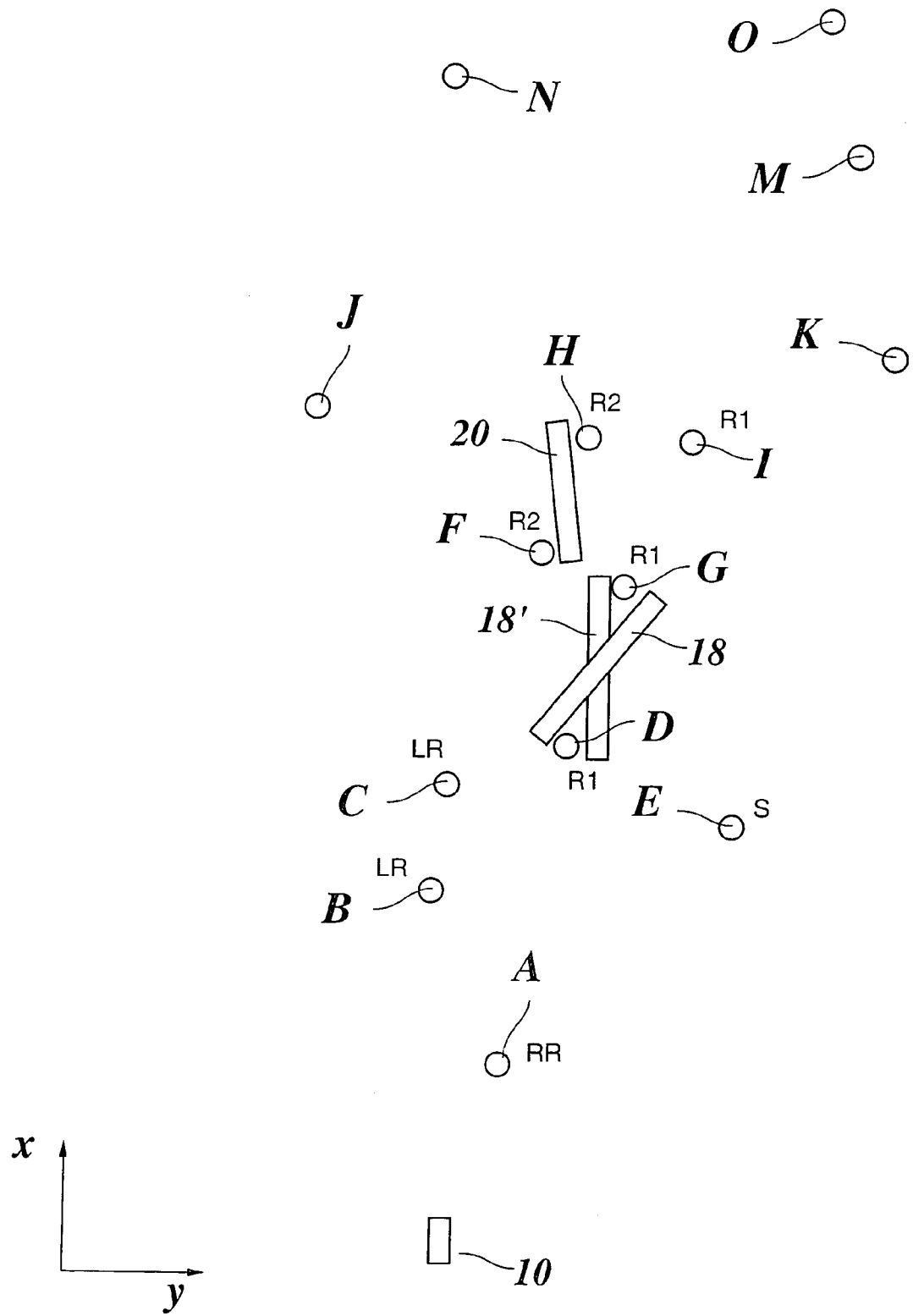
FIG. 8 shows a diagram to illustrate the use of the third plausibility criterion on additional objects.

FIG. 8 shows hypothetical road paths 18, 18' indicated here only by short sections of road between objects D and G. The considerations already explained with respect to object C yield the result here that objects D and G are on the same side of the road. The same finding may also be made for objects G and I. All three objects are therefore provisionally classified in an undefined class R1.

In addition, FIG. 8 shows a hypothetical road path 20 passing between objects F and H. Again the same considerations yield the conclusion that these two objects are on the same side of the road. They are classified in an undefined class R2. However, it may also be seen here that objects F and G are approximately the same distance away from vehicle 10. Consequently, they may be on the same side of the road. Object G is at the right of object F, so it is now possible to decide that objects D, G and I are on the right of the road (category RR) while objects F and H are on the left of the road (category LR).

Figure 9:
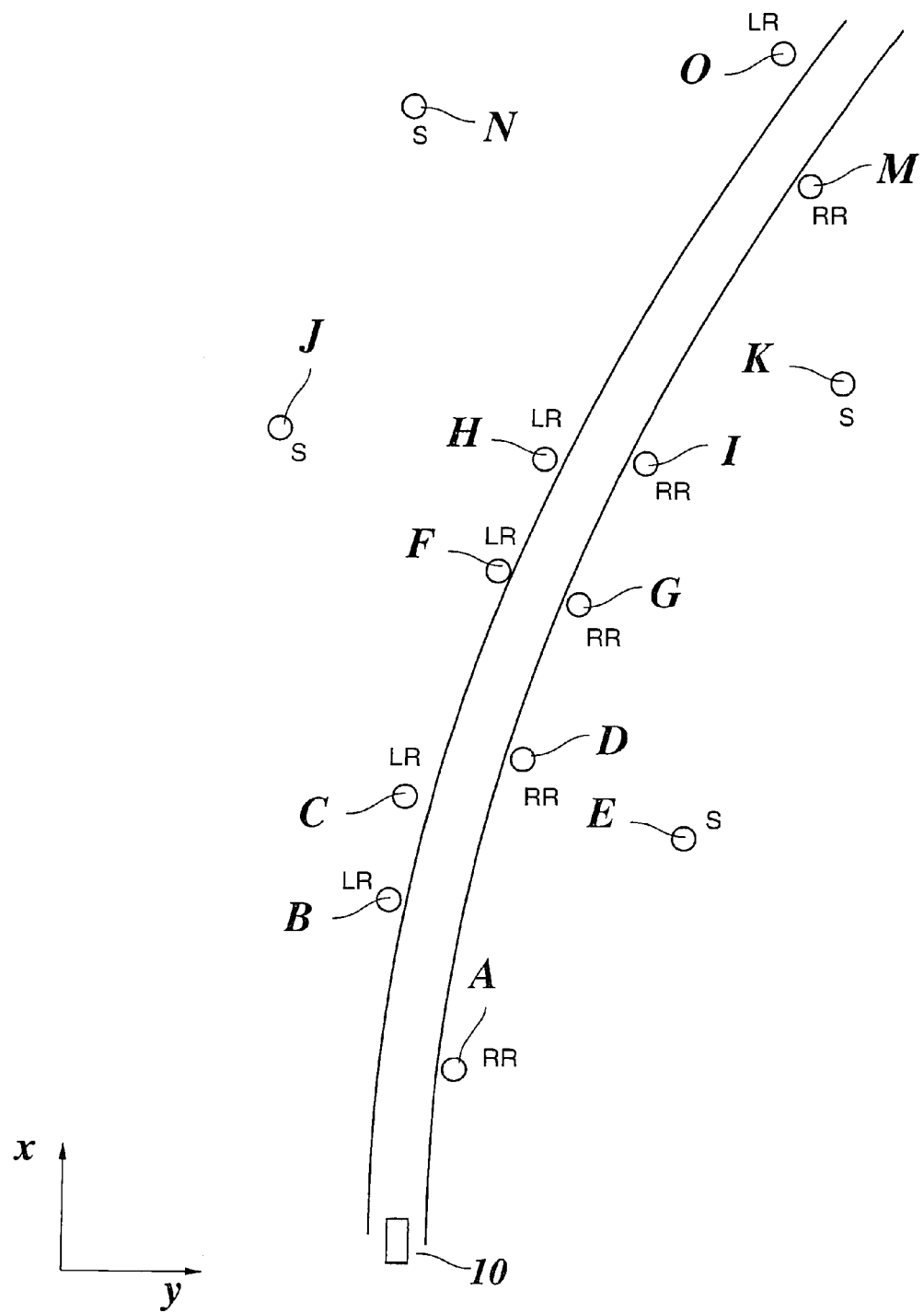
FIG. 9 shows a diagram corresponding to FIG. 1 to illustrate the result of the plausibility checks.

FIG. 9 shows the corresponding classification for objects G through I. If it is assumed that objects D, G, and I are roadside targets, they really are on the right side of the road, then a parabola describing that particular side of the road is computable for each object (with vehicle 10 as the second interpolation point in each case). This shows that essentially the same parabola is obtained in each case. This is also true of objects B, C, F and H. Additional checks of the other objects show that approximately one of the known parabolas is obtained for each object M and O but not for objects J and K. It is therefore justifiable to classify objects M and O as roadside targets (category RR or LR) but objects K and N as interfering objects (category S). If all interfering objects are eliminated, then two parabolas may be determined on the basis of the remaining roadside targets, each parabola representing the best approximation for the objects on the right and left sides of the road and therefore having a high probability of representing the actual shape of the right and left sides of the road. This therefore achieves the object of performing a plausible travel course prediction simply by analyzing the coordinates of stationary targets.

Figure 10:
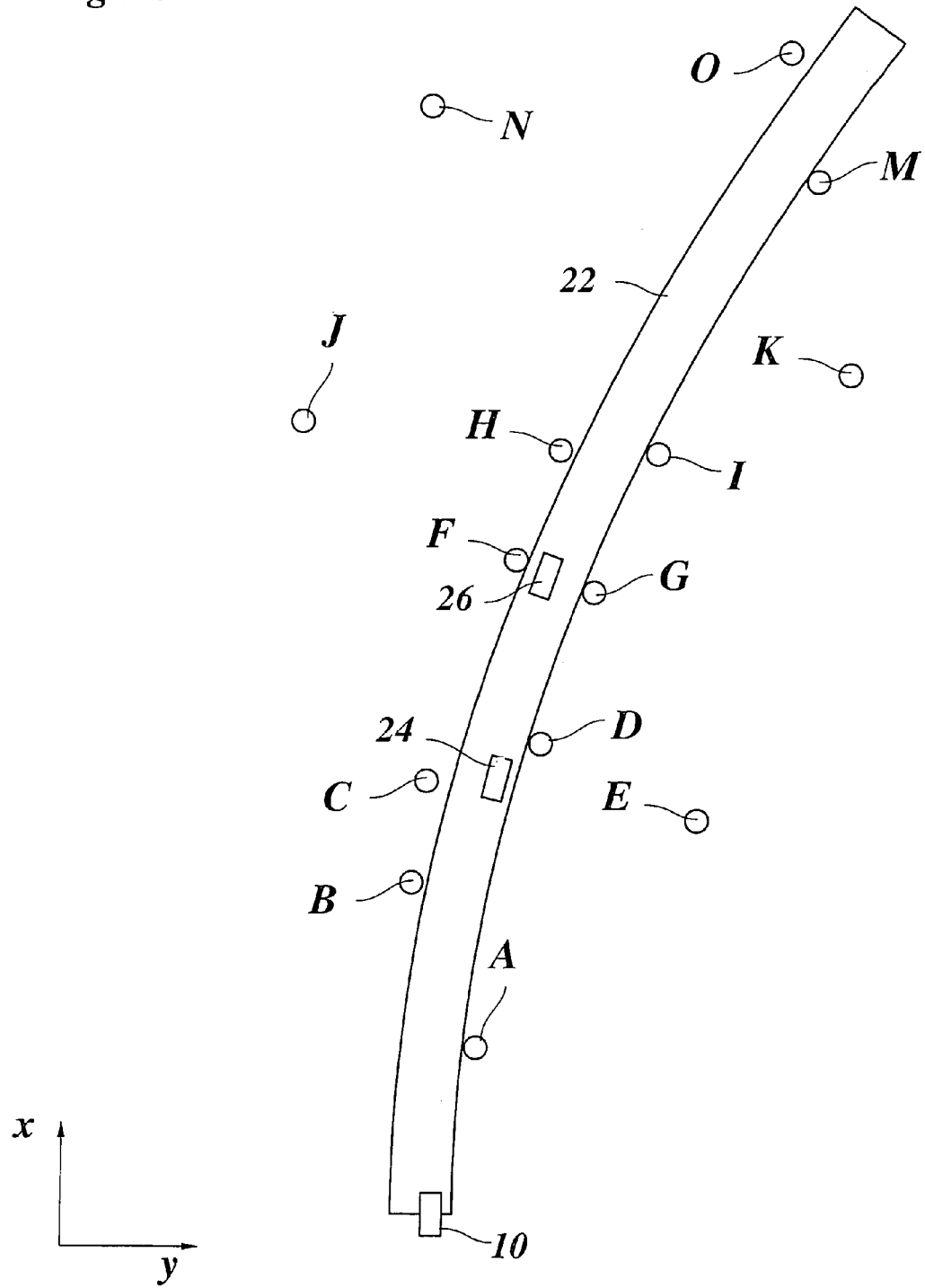
FIG. 10 shows a diagram to illustrate a fifth plausibility criterion.

FIG. 10 shows the corresponding path of true road 22. In addition, the positions of two lead vehicles 24 and 26 are also shown here; these vehicles are offset laterally and are traveling in different lanes on road 22. According to an expedient embodiment of the method, the positions of these lead vehicles are also used as plausibility criteria. The positions of vehicles 24 and 26 themselves reveal the path of the road only inaccurately, but vehicle 24 is already passing objects C and E, so object C is unambiguously classifiable as being an object on the left side of the road merely by comparison with the position of vehicle 24, and object E is classifiable as an interfering object merely because of the great distance from vehicle 24. Accordingly, with the help of vehicle 26, objects F and G are unambiguously classifiable as objects on the left and right sides of the road, respectively. By analyzing the criteria based on the positions of lead vehicles, it is possible to reduce the computation complexity considerably and to accelerate the computation accordingly. At the same time, the reliability of the method is also greatly increased.

Figure 11:
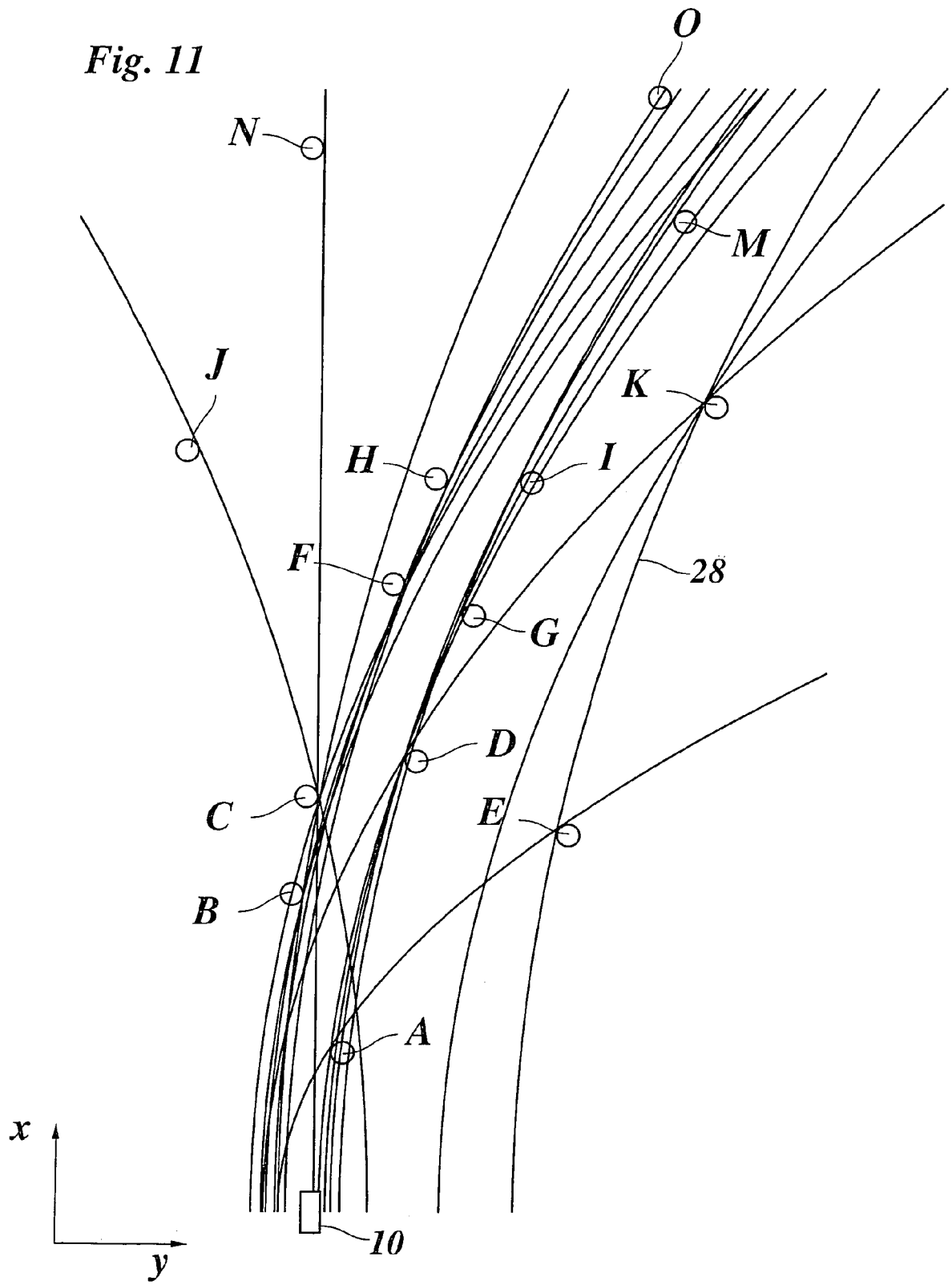
FIG. 11 shows a diagram corresponding to FIG. 1 to illustrate a method for travel course prediction according to a second exemplary embodiment.

FIG. 11 illustrates another embodiment of the method in which hypothetical road curves 28 are analyzed statistically. Roadside curves 28 are again represented by parabolas of the form $y=a+cx^2$. To calculate coefficients a and c, the positions of two of objects A through O are used as interpolation points. Essentially each object A through O may form with any other of these objects a pair which defines a corresponding roadside curve 28. When there are n objects, the number of possible roadside curves 28, only a few of which are shown in FIG. 11 as an example, is given by $n(n-1)/2$. Pairs of objects being the same distance away from vehicle 10 but having a definite angular distance from one another may be disregarded from the beginning because the corresponding parabolas do not represent a realistic shape of the roadside. If the positions of lead vehicles are also analyzed, as in FIG. 1, such pairs of objects, which are already known to be on different sides of the road, may be disregarded. The number of roadside curves 28 not completely ruled out is generally so high that a statistical analysis is possible.

As a rule, most of the objects detected are true roadside targets, e.g., supporting posts for guardrails, guide posts, traffic signs and the like, so there is a statistical frequency of roadside curves corresponding approximately to the left and right sides of the road. The true curvature of the road may be determined in this way by checking on the value at which the curvatures of roadside curves 28 and/or the respective coefficients c have a frequency maximum.

Figure 12:
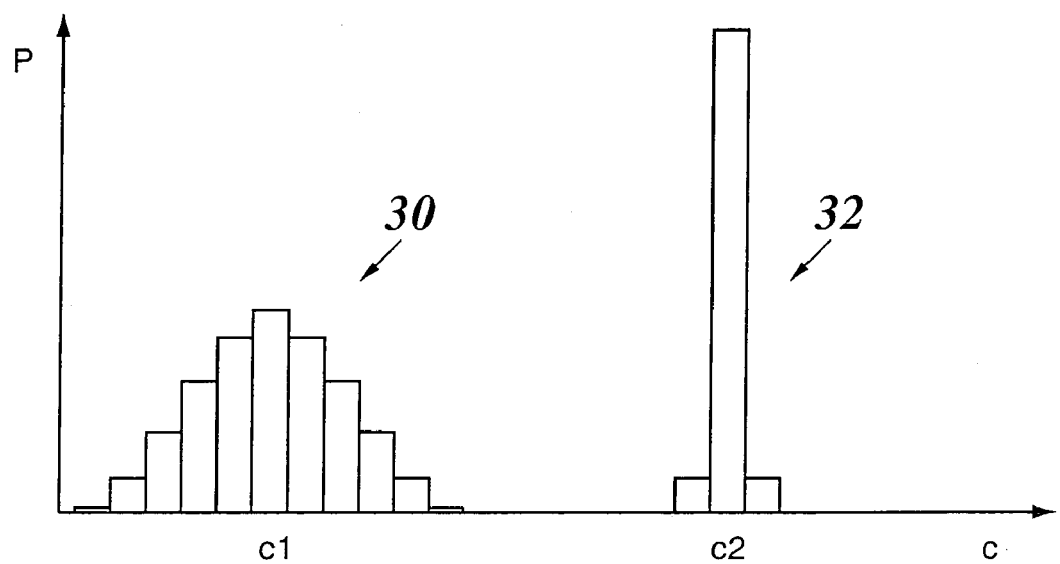
FIG. 12 shows an error diagram to illustrate a method for analyzing measured results in the second exemplary embodiment.

It is expediently taken into account here that the coordinates of objects A through O are known in practice with only a limited accuracy, the limits of error (in particular with regard to the y coordinate) usually being greater for objects at a greater distance than for objects closer to vehicle 10. On the basis of the known limits of error for the coordinates of the objects, limits of error corresponding to each of the roadside curves may therefore also be given for coefficients c (and also for coefficients a). A probability distribution, e.g., a Gaussian distribution, having a great standard deviation for large limits of error and a small standard deviation for narrow limits of error may then be assumed for the actual value of coefficient c. FIG. 12 shows examples of such probability distributions in the form of a histogram. Coefficient c is shown on the horizontal axis in FIG. 12, and probability p is shown on the vertical axis. Relatively broad probability distribution 30 corresponds to a roadside curve 28 for the curvature, i.e., coefficient c could be determined only relatively inaccurately. Value c1 actually measured corresponds to the maximum of the probability distribution. Probability distribution 32, however, corresponds to a roadside curve 28 for which value c2 of curvature c has been determined with a relatively high accuracy. For each roadside curve 28 analyzed, such a probability distribution is shown in the form of a histogram. The possible range of coefficients c is divided into discrete intervals and corresponding probabilities p are given as discrete values, e.g., as integers. These numbers may be selected so that the areas under the distribution curves are the same for all roadside curves. In this case all roadside curves are weighted equally but the standard deviation is greater for the curves that are measured less accurately. It is optionally also possible to assign a greater weight to the curves that are measured more accurately.

Figure 13:
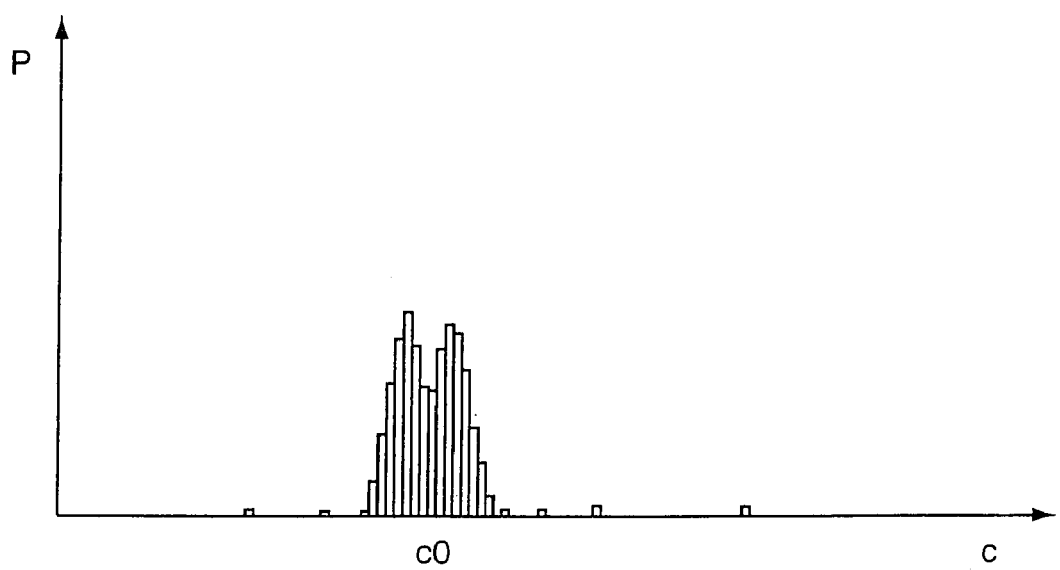
FIG. 13 shows a histogram of the measurement results in the method according to the second exemplary embodiment.

FIG. 13 shows a diagram obtained by adding the probability distributions for all roadside curves 28. This histogram shows a definite maximum at a value c0 corresponding to the actual curvature of the road. For false roadside curves 28 obtained through "wrong" combinations of objects, coefficients c have a much greater standard deviation, however, so they are manifested only as background noise in the histogram in FIG. 13.

If the actual road follows a relatively narrow curve and if relatively few true roadside targets are present, then two partial maximums may be distinguished in the histogram, corresponding to the somewhat different curvatures of the right and left sides of the road.

A parabola $y=cx^2$ may be calculated simply on the basis of the position of the maximum derivable from the histogram according to FIG. 13 or from the position of the area center of gravity at c0; this parabola corresponds in good approximation to the actual path of the road and runs through the center of vehicle 10. When using the area center of gravity, the accuracy may be increased further by eliminating the values of c far away from the maximum in the histogram. In addition, the value range for coefficient c may be limited to the "plausible" curvatures, i.e., for example, to those corresponding to a transverse acceleration of the vehicle of less than 3 m/s². The value range and the division of the value range into discrete values for c may also be adapted as a function of speed because in the case of a country road having a lot of curves, where it is necessary to drive at a low speed, the curvatures will show a greater standard deviation than on a highway.

The statistical analysis described above for coefficient c may also be similarly performed for coefficient a. In this case, two clearly differentiable maximums will be found, indicating the position of the right and left sides of the road. On the basis of coefficient a that is determined and coefficient c0 determined from FIG. 13, parabolas of the form $y=a+c0 \cdot x^2$ may then be given, describing the shape of the right and left sides of the road.

Optionally, however, the roadside curves that contribute to the maximum in the vicinity of c0 may be selected from the histogram in FIG. 13 and a statistical analysis for a may then be performed for only these roadside curves. If, as in FIG. 13, the histogram has two differentiable peaks for the right and left sides of the road, only those roadside curves 28 which are within the particular peak—and in the case of a right-hand curve, these will be the ones with the greater curvature—may also be used for the parabolas that are to describe the left side of the road, and then the average is formed from coefficient a for these roadside curves. The situation is similar for the right side of the road. The value range for coefficient a is expediently limited to plausible road widths. Roadside curves whose coefficient a is outside of this value range may then be eliminated in advance.

Conversely, a statistical analysis for coefficient a may then also be performed and the frequency maximum of coefficient c may be sought for curves that contribute to the maximum for a.

In principle, the statistical method may also be generalized to include polynomials of a higher degree. However, then the number of interpolation points and thus the number of possible combinations of interpolation points will be so great that the computation complexity would be enormous. However, it is practical to first determine the objects that are true roadside targets by statistical analysis of the parabolic roadside curves 28 and then to approximate the roadside targets on the right and left sides of the road by a higher order polynomial in each case.

What is claimed is:

1. A method for travel course prediction in a motor vehicle, the motor vehicle having a position finding system for objects situated ahead of the motor vehicle traveling on a road, a function describing the shape of a roadside being computable on the basis of measured distance data and angle data for stationary targets, the method comprising:
   identifying and tracking stationary targets with the position finding system;
   estimating, with a processor, a possible shape of the roadside for each of a plurality of subsets of the stationary targets, using an assumption that the stationary targets of that particular subset are located on the roadside;
   differentiating, with the processor, stationary targets into roadside targets and interfering objects on the basis of at least one plausibility criterion applied to the estimated possible shape of the roadside for a particular subset; and
   determining, with the processor, the most probable shape of the roadside on the basis of the roadside targets.

2. The method as recited in claim 1, wherein measured distance data and angle data of preceding vehicles are used as the at least one plausibility criterion.

3. The method as recited in claim 1, wherein the function describing the shape of the roadside is a polynomial function.

4. The method as recited in claim 3, wherein the polynomial function is a polynomial function of the second degree.

5. The method as recited in claim 3, wherein the coordinates of at least one stationary target are used as data points for calculation of the coefficients of the polynomial function, and an estimate of the distance between the motor vehicle and the roadside is used for a constant term of the polynomial function.

6. The method as recited in claim 1, wherein the at least one plausibility criterion is that a curvature of the roadside is less than a first limiting value.

7. The method as recited in claim 6, wherein the first limiting value depends on the motor vehicle speed.

8. The method as recited in claim 1, wherein the at least one plausibility criterion is that the rate of change of the curvature of the roadside per unit of length is smaller than a second limiting value.

9. The method as recited in claim 8, wherein the second limiting value depends on the motor vehicle speed.

10. The method as recited in claim 1, further comprising:
    differentiating stationary targets into stationary targets on the left side of the roadway and stationary targets on the right side of the roadway, based on at least one further plausibility criterion.

11. The method as recited in claim 10, wherein the at least one further plausibility criterion for two stationary targets being on the same side of the roadway is that a hypothetical road path having a predetermined road width between the two stationary targets has a maximum curvature greater than a third limiting value.

12. The method as recited in claim 11, wherein the third limiting value depends on the motor vehicle speed.

13. The method as recited in claim 10, wherein measured distance data and angle data of preceding vehicles are used as the at least one further plausibility criterion.

14. The method as recited in claim 1, wherein the at least one plausibility criterion for a stationary target being an interfering object is that the distance between the stationary target and a shape of the roadside which approximates at least one previously recognized roadside target is greater than a fourth limiting value.

15. The method as recited in claim 1, further comprising:
    performing a statistical analysis of the shape of the roadside determined from the plurality of subsets of the stationary targets, wherein the at least one plausibility criterion is that at least one parameter of the function describing the shape of the roadside has a significant frequency maximum.

16. The method as recited in claim 15, wherein each of the subsets of the stationary targets includes at least two stationary targets.

17. The method as recited in claim 15, wherein the function describing the shape of the roadside is a polynomial function.

18. The method as recited in claim 17, wherein the polynomial function is a polynomial function of the second degree.

19. The method as recited in claim 18, wherein the at least one parameter is the coefficient of the quadratic term of the polynomial function.

20. The method as recited in claim 15, wherein the statistical analysis of the shape of the roadside is performed accounting for an error range of the measured distance data and angle data.

21. The method as recited in claim 1, wherein the stationary targets include objects that have left a detection range of the position finding system and whose positions are calculated on the basis of the motor vehicle movement.

22. A device for travel course prediction in a motor vehicle, the motor vehicle having a position finding system for objects situated ahead of the motor vehicle traveling on a road, a function describing the shape of a roadside being computable on the basis of measured distance data and angle data for stationary targets, the device comprising:
   an identifying arrangement to identify and tracking stationary targets;
   an estimating arrangement to estimate a possible shape of the roadside for each of a plurality of subsets of the stationary targets, using an assumption that the stationary targets of that particular subset are located on the roadside;
   a differentiating arrangement to differentiate stationary target into roadside targets and interfering objects on the basis of at least one plausibility criterion applied to the estimated possible shape of the roadside; and
   a determining arrangement to determine a most probable shape of the roadside on the basis of the roadside targets.

23. The method as recited in claim 1, wherein the at least one plausibility criterion is that a curvature of the roadside is less than a first limiting value, and wherein the first limiting value depends on the motor vehicle speed.

24. The method as recited in claim 1, wherein the at least one plausibility criterion is that the rate of change of the curvature of the roadside per unit of length is smaller than a second limiting value, and wherein the second limiting value depends on the motor vehicle speed.

25. The method as recited in claim 1, wherein the at least one further plausibility criterion for two stationary targets being on the same side of the roadway is that a hypothetical road path having a predetermined road width between the two stationary targets has a maximum curvature greater than a third limiting value, and wherein the third limiting value depends on the motor vehicle speed.

* * * * *